US007461446B2

(12) United States Patent
McKean et al.

(10) Patent No.: US 7,461,446 B2
(45) Date of Patent: Dec. 9, 2008

(54) METHOD FOR REPAIRING PHOTORESIST LAYER DEFECTS USING INDEX MATCHING OVERCOAT

(75) Inventors: Dennis Richard McKean, Milpitas, CA (US); Gary John Suzuki, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 403 days.

(21) Appl. No.: 11/257,911

(22) Filed: Oct. 24, 2005

(65) Prior Publication Data

US 2007/0089288 A1 Apr. 26, 2007

(51) Int. Cl.
*G11B 5/127* (2006.01)
*H04R 31/00* (2006.01)

(52) U.S. Cl. .................. 29/603.12; 29/417; 29/603.06; 29/603.15; 204/192.34; 204/192.1; 360/230; 360/237.1; 438/455; 438/458; 438/946; 451/5; 451/41

(58) Field of Classification Search .................. 29/417, 29/603.09, 603.12–603.16, 603.18; 360/230–237.1; 204/192.34, 192.1; 438/455, 458, 976; 451/5, 451/41
See application file for complete search history.

(56) References Cited

U.S. PATENT DOCUMENTS

| | | | | |
|---|---|---|---|---|
| 5,597,677 | A | 1/1997 | Kangas et al. | |
| 5,982,545 | A * | 11/1999 | Su | 359/569 |
| 6,727,047 | B2 | 4/2004 | Montgomery et al. | |
| 6,852,421 | B2 | 2/2005 | Wayton et al. | |
| 6,884,735 | B1 * | 4/2005 | Okoroanyanwu et al. | 438/725 |
| 7,319,224 | B2 * | 1/2008 | Park et al. | 250/306 |
| 2002/0102500 | A1 * | 8/2002 | Hung et al. | 430/322 |
| 2005/0042554 | A1 | 2/2005 | Dierichs et al. | |

* cited by examiner

*Primary Examiner*—Paul D Kim
(74) *Attorney, Agent, or Firm*—Patent Law Office of Larry Guernsey; Larry B. Guernsey

(57) ABSTRACT

A method is presented for repairing damaged photomasks for electronic component fabrication processes, particularly for fabrication of the ABS of a disk drive slider. The method includes applying an overcoat of material having index of fraction which is close to the index of refraction of the photoresist material of the damaged photomask to produce a non-scattering boundary surface. The overcoat material preferably includes an overcoat base material which is a polymer having an index of refraction which is in the range of plus or minus 0.1 from the index of refraction of said photoresist material.

12 Claims, 6 Drawing Sheets

10
18
36
15
34
15
14
14
16
16
13
13
12

METHOD FOR REPAIRING PHOTORESIST LAYER DEFECTS USING INDEX MATCHING OVERCOAT

BACKGROUND OF THE INVENTION

1. Field of the Invention

The present invention relates generally to fabrication of sliders for disk drive heads, and more particularly to the forming of the air-bearing surface of the sliders using photoresist techniques.

2. Description of the Prior Art

Data is stored and retrieved from a computer disk drive by positioning a magnetic read/write head over a rotating magnetic data storage disk. The magnetic heads are positioned close to one or more rotating disks containing magnetic material which records the information in concentric data tracks defined on surfaces of the disks, which are typically arranged in stacks. The head, or heads, which are also typically arranged in stacks, read from or write data to the disks. The heads are included in structures called "sliders" into which the read/write sensors are imbedded during fabrication. The write head operates to write data onto the disk by aligning magnetic poles of data bits of the magnetic material. A read head reads data by sensing the alignment of these data bit poles. Because the magnetic fields are very small, it is important that the read and/or write head is located very near the surface of the disk. Heads are typically fabricated as part of air bearing sliders which are specifically shaped so that the movement of the disk relative to the slider will provide a lifting force to cause the slider to fly above the disk when upon an air-stream existing close to the surface of the rotating disk.

Magnetic heads are usually fabricated as part of sliders either at the end of one or both of the side rails (also called pads) of the slider, or at a position near the center of the back end of the slider. The front end of the slider typically flies higher than the rear end, which aids in establishing air flow into regions of positive pressure, which act to lift the slider. This also allows the heads to be positioned closer to the disk surface. The lower surface of the slider is generally known as the Air Bearing Surface (ABS), and the shape of this ABS is critical to several different parameters which affect slider and head performance. The shape of this ABS has become the object of increasing subtlety and sophistication so that there may be areas of negative pressure which produce a slight "suction" effect which can be used to counter positive pressure in other portions of the ABS. The contour established is thus a matter of some precision and delicacy.

In order to shape this ABS contour, the typical procedure in the art involves using photoresist material to mask certain areas from the effects of shaping tools such as ion milling beams, and leaving other areas exposed for shaping. However, there have been certain problems encountered with the use of certain commercial photoresist materials.

Slider air-bearing patterning processes currently use relatively thick photoresist coating (>10 micrometers) to provide shallow etch wall profiles for improved lift characteristics. Liquid-apply photoresists are advantageous for this application because their usage avoids the fence formation that can contribute to particle formation in the drive. However a thick liquid photoresist process can be problematic due to cracking of the resist film. Cracking of the brittle thick photoresist material occurs during the baking step and is most pronounced in the gaps between sliders. These cracks produce irregular surfaces in the photoresist masks which can cause scattering of the exposure beams. Small manufacturing defects, known "reflective notching defects" or "mouse bites" are produced when scattered exposure beams erode portions of the edges of the pads. The sliders produced from this exposure have ABS pads with unacceptably high edge roughness that require scraping of the part. Yield loss as high as 10% due to this problem has been observed.

FIG. 1 (prior art) shows the air bearing surface of a slider 2 having a main body 3 and two pads 6, 7 also called side rails. The read/write head 4 is shown to be centrally disposed in a center platform 5 in this example, but may also be disposed at the end of one of the side rails or pads 6, 7. The pads 6, 7 and indeed the entire lower surface of the slider are very carefully designed for precise flow of air along the air bearing surface ABS 9. There are generally areas of positive pressure created when air flows over raised areas, such as the pads 6, 7 and there are also negative air pressure areas which serve to draw portions of the slider towards the surface of the disk and stabilize the flight of the slider.

FIGS. 2-7 show steps in the fabrication process of the prior art, with the production of reflective notching defects. In FIG. 2 (prior art), the photoresist material 14 is applied to the unshaped block 12 of material, which is to be formed into the slider, and then baked. It is during this baking process that the cracks of the cracked area 24 and surface irregularities develop as shown in FIG. 3 (prior art). The cracks are greatly exaggerated for sake of illustration in the figure, and it is commonly observed that the cracks are actually more numerous near the outer edges of the slider. Thus the placement and magnitude of the cracks are not to be taken as limitations, but serve only to illuminate the discussion.

FIG. 4 (prior art) shows the next step in the process. After the photoresist is baked, a pattern mask 15 is applied to the photoresist 14, which will serve to shield portions of the photoresist material 14 from light exposure. Again, the figure has been greatly simplified with only two areas of the pattern mask 15 shown, corresponding to the two side rails or pads 6, 7 (see FIG. 1), which will be formed. It will be understood that in practice, the pattern mask 15 is more spatially removed from the surface of the photoresist layer 14, generally with a lens (not shown) between pattern mask 15 and the photoresist layer 14 to focus the pattern onto the surface of the photoresist 14. For the sake of simplifying the illustration, the lens has been omitted from the figure and the pattern mask 15 draw in closer proximity to the photoresist layer 14 than is realistic.

Light beams 10 strike the photoresist 14, and the pattern mask 15, and wherever the light beams 10 strike the uncovered photoresist 14, the photoresist 14 is exposed. The photoresist 14 thus exposed becomes soluble to developer and can be removed in the following step. Ideally, the pattern mask 15 will form protected areas 16 in photoresist material 14, leaving the exposed portions 18 uncovered, which will later be removed. Dashed boundary lines 13 show the intended boundaries of the protected areas 16.

Defects arise when light beams 10 strike cracked areas 24 and are reflected or scattered into the protected regions 16, making unintended exposed areas 19. Scattered beams 21 are shown striking angled surfaces in the cracked area 24, forming unintended exposed areas 19 which extend past the dashed boundary line 13 into the protected areas 16.

FIG. 5 (prior art) shows the next step in which developer has been applied and the pattern mask 15 (see FIG. 4), and both intended exposed areas 18 and unintended exposed areas 19, have been removed. The developed photoresist pattern 25 thus covers portions of the unshaped block 12, but the protected areas 16 do not extend to the dashed line boundary 13, as intended.

In FIG. 6 (prior art), the developed photomask 25 and unshaped block 12 are subjected to a milling source 26, preferably ion milling beams 28. The developed photomask 25 creates protected areas 29 of the slider block 12 and intentionally exposed areas 30 of the slider block 12, as well as unintentionally exposed areas 31. The ion milling beams 28 remove exposed material in both intentionally exposed areas 30 and unintentionally exposed areas 31, thus creating the reflective notching defects 8 shown in the shaped slider structure 32 seen in FIG. 7 (prior art). Again, it is to be understood that the defects are shown greatly exaggerated and much more regular in configuration that those commonly experienced, but they have been simplified for purposes of illustration. If the defects are severe enough, the entire slider may have to be discarded as defective.

Thus there is a need for a method of fabrication and a treatment for photoresist mask material which can reduce scattering of the light beams during exposure, and thus reduce reflective notching defects.

SUMMARY OF THE INVENTION

A preferred embodiment of the present invention is a method of repairing damaged photoresist material for electronic component fabrication processes, particularly for fabrication of the ABS of a disk drive slider. The method includes applying an overcoat of material having index of fraction which is close to the index of refraction of the photoresist material of the damaged photomask to produce a non-scattering boundary surface. The overcoat material preferably includes an overcoat base material which is a polymer having an index of refraction which is in the range of plus or minus 0.1 from the index of refraction of said photoresist material.

It is an advantage of the present invention that it produces sliders with more uniform topography.

It is another advantage of the present invention that it produces higher production yields of sliders.

It is a further advantage of the present invention that it is more efficient and produces less waste during fabrication runs.

It is yet another advantage of the present invention that it produces sliders with less surface roughness.

It is an advantage of the present invention that it produces sliders with better flying characteristics.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
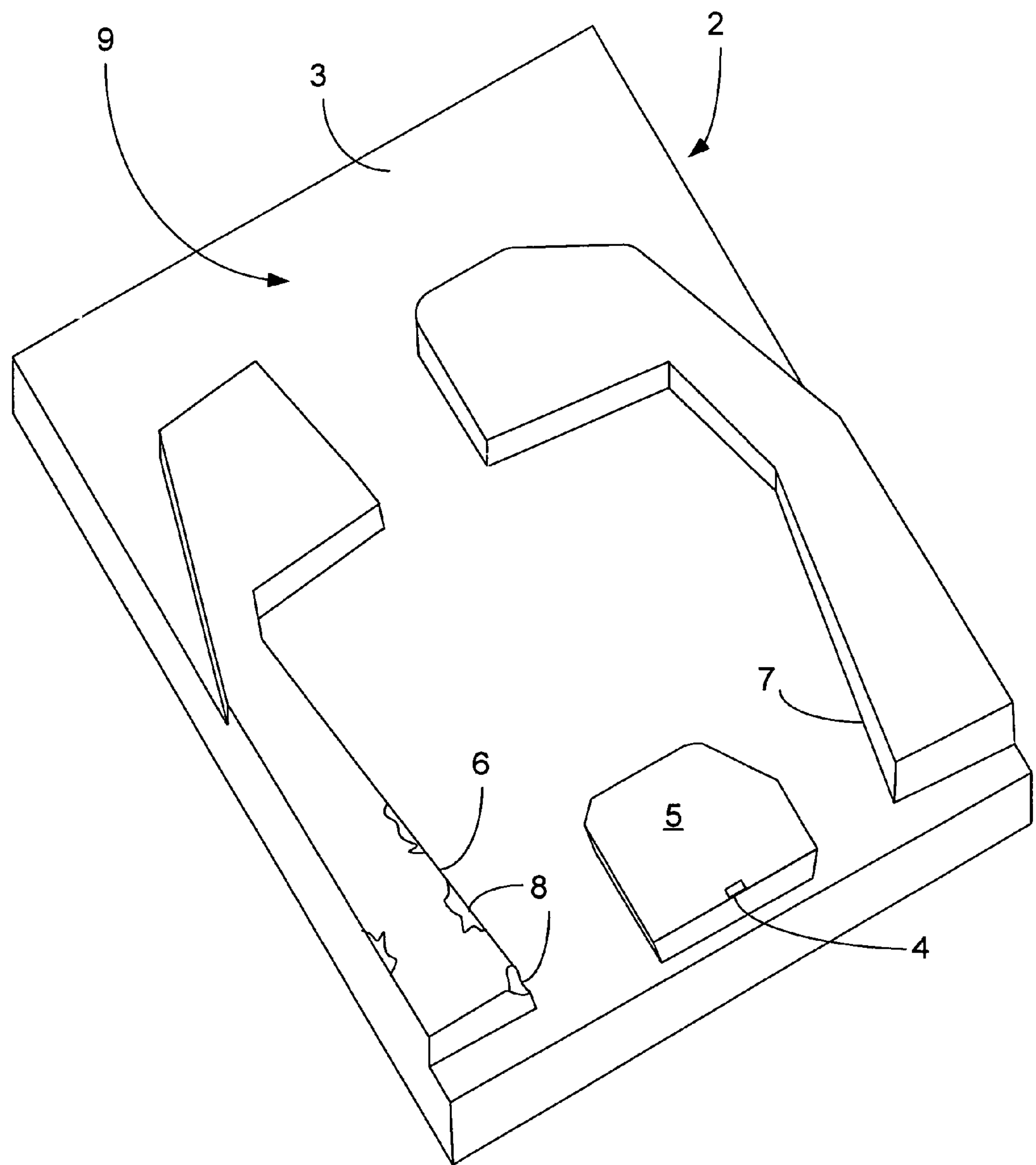
FIG. 1 is a perspective view of the ABS of a representative slider having reflective notching defects.
Figure 2:
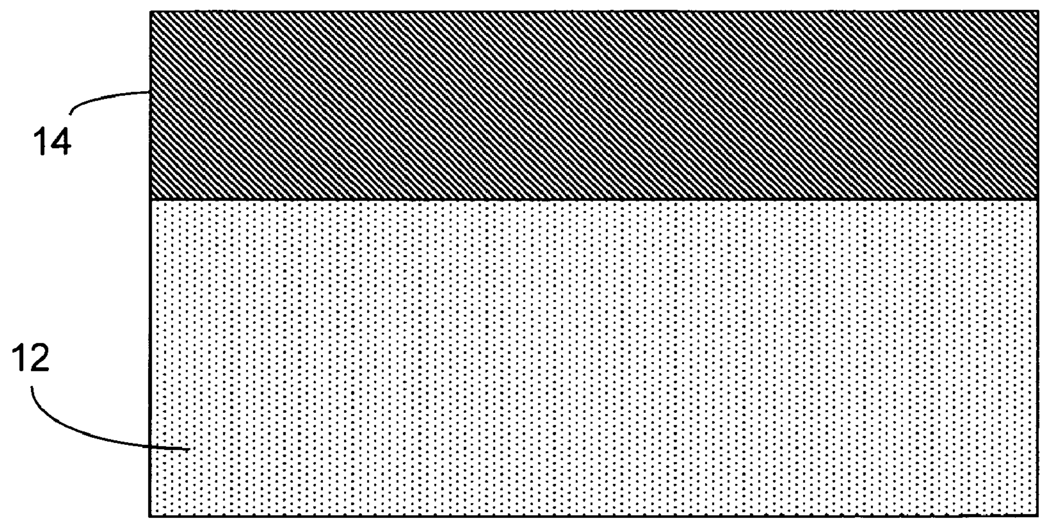
FIGS. 2-7 are a cross-sectional views of a various stages of fabrication of a slider by the method of the prior art.
Figure 3:
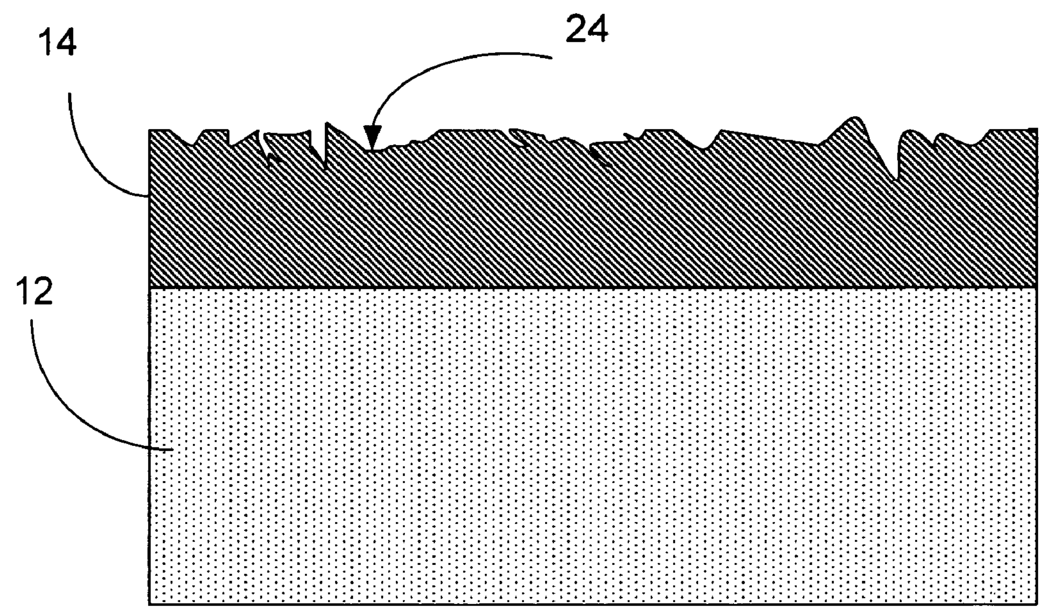
Figure 4:
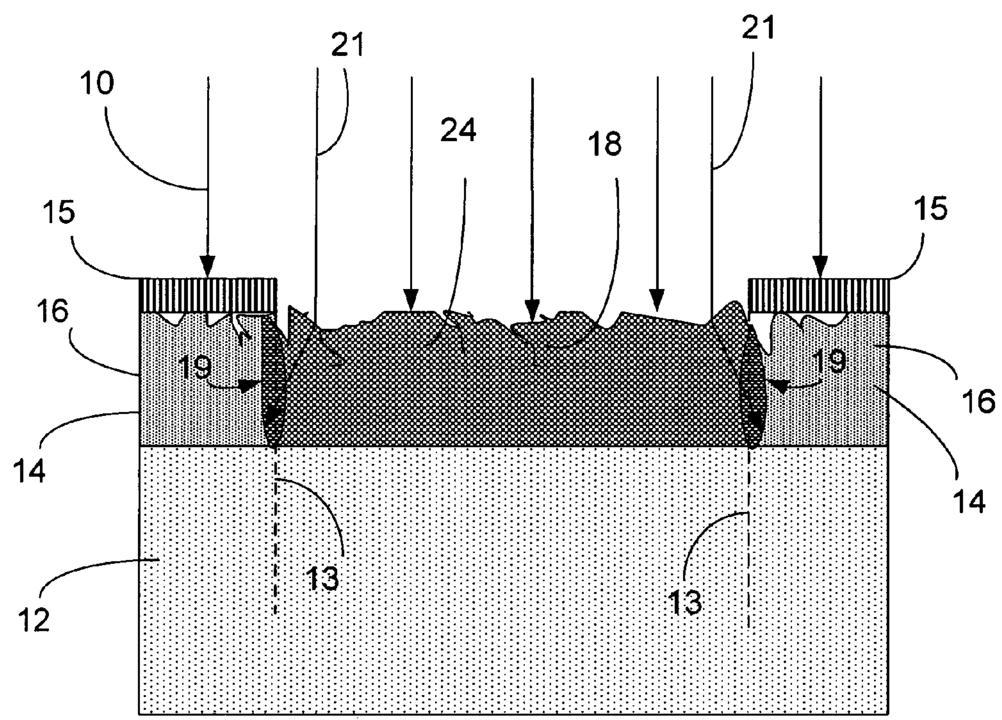
Figure 5:
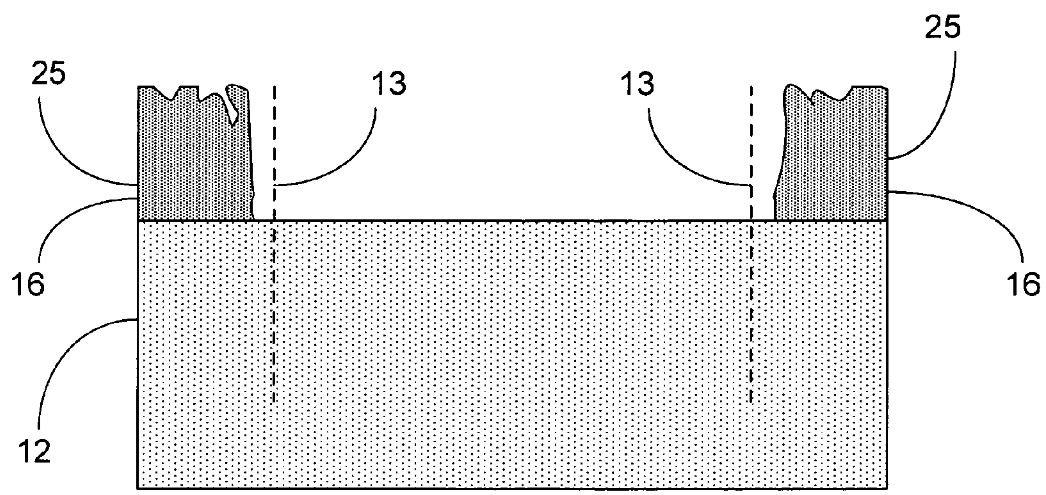
Figure 6:
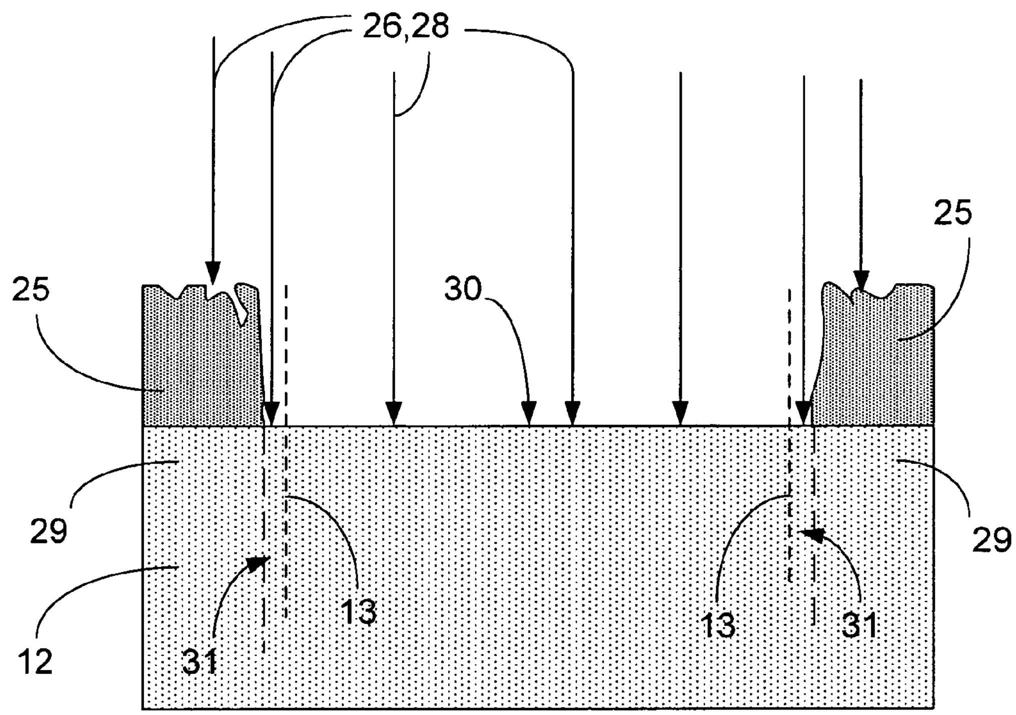
Figure 7:
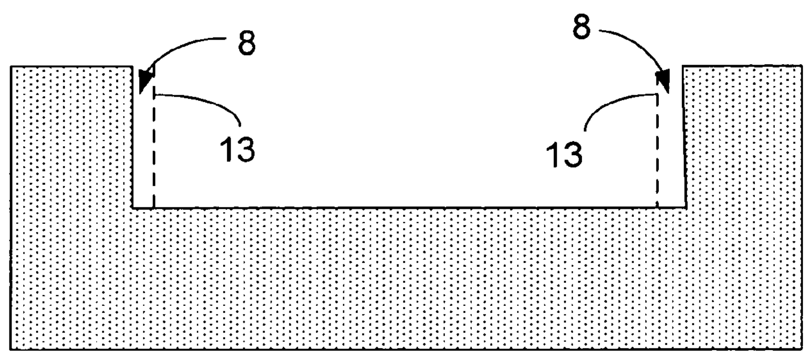

FIG. 1 (prior art) shows the air bearing surface 9 of a slider 2 having a main body 3 and two pads 6, 7 also called side rails. The read/write head 4 is shown to be centrally disposed in a center platform 5 in this example, but may also be disposed at the end of one of the side rails or pads 6, 7. The pads 6, 7 and indeed the entire lower surface of the slider is very carefully designed for precise flow of air along the air bearing surface ABS 9. There are generally areas of positive pressure created when air flows over raised areas, such as the pads 6, 7 and there are also negative air pressure areas which serve to draw portions of the slider towards the surface of the disk and stabilize the flight of the slider. Thus the topography of the ABS is very precisely designed and is crucial to the performance of the slider. Any deviation or defects in the topography of the ABS can be fatal to the performance of the slider and thus of the entire disk drive.

As discussed above, slider air-bearing patterning processes currently use relatively thick photoresist coating (>10 micrometers) to provide shallow etch wall profiles for improved lift characteristics. Liquid-apply photoresists are advantageous for this application because their usage avoids the fence formation that can contribute to particle formation in the drive. While the thick liquid resist process has been successfully implemented for fabricating processes in which sliders are processed together in a row-bar carrier, problems have been encountered during attempted qualification for the single slider process. The thick photoresist material is quite brittle and during the bake step, the photoresist is prone to cracking in the gaps between sliders. These cracks produce irregular surfaces in the photoresist masks which can cause scattering of the light beams in the developer process. Scattered developing light beams strike unintended areas of the photomask, which are then removed during the developing process. The damaged photomask thus leaves areas of the slider open to milling beam erosion in areas intended to be protected. These small manufacturing defects have come to be known as “reflective notching defects” or “mouse bites” The sliders produced from this exposure have ABS pads with unacceptably high edge roughness that require scraping of the part. Yield loss as high as 10% has occurred due to this problem.

The left side pad 6 in FIG. 1 (prior art) is shown to have suffered several of these reflective notching defects 8. The method of the present invention can eliminate or at least greatly reduce the reflective notching defects described above. This is done by applying an overcoat to the photoresist layer with a substance whose refractive index is close enough to the refractive index of the photoresist materials. In this fashion any cracks formed in the photoresist are filled with the index matching material and the resulting smooth wall surface is free from irregularities which cause scattering.

The index of refraction is a measure of the speed of light in that material compared to that of light in a vacuum. It is expressed as a ratio, and therefore is a dimensionless number. One very common application of the index of refraction in optics is the bending or refracting of light through lenses. Light bends towards the normal line to a material when light goes from a less dense to a more dense medium. Thus the passage of light from air (a less dense medium) into a glass lens (a more dense medium) makes the light bend towards the normal to the glass lens’ surface. However if a light beam passes from a first medium to a second medium having the same index of refraction as the first, the light beam is undeflected, and the two materials are said to be index matched.

At the boundary between two materials of different index of refraction, for a certain range of approach angles to the boundary, there will be reflections from the boundary. When a light beam passes from a first less dense medium, such as air, into a second more dense medium such as photoresist material, there will be reflections of a portion of the light beam which approaches at less a critical angle. If the surface of the second medium is irregular, certain portions of the surface are likely to lie at angles less than Brewster's angle, and thus be reflected. Irregular surfaces thus can produce reflections at irregular angles, which is perceived as scattering the light.

The present invention presents a method by which material having an index of refraction which closely matches that of the photoresist is coated onto the photoresist material after it is baked, to fill in the roughness of the surface. Thus the surface is restored to a more uniform surface which does not present portions at irregular angles which can reflect the light beams and thus scatter them.

The present invention may be best understood by a comparison with the fabrication method of the prior art, shown in FIGS. 2-7, and reference is made hereby to the discussion above.

Figure 8:
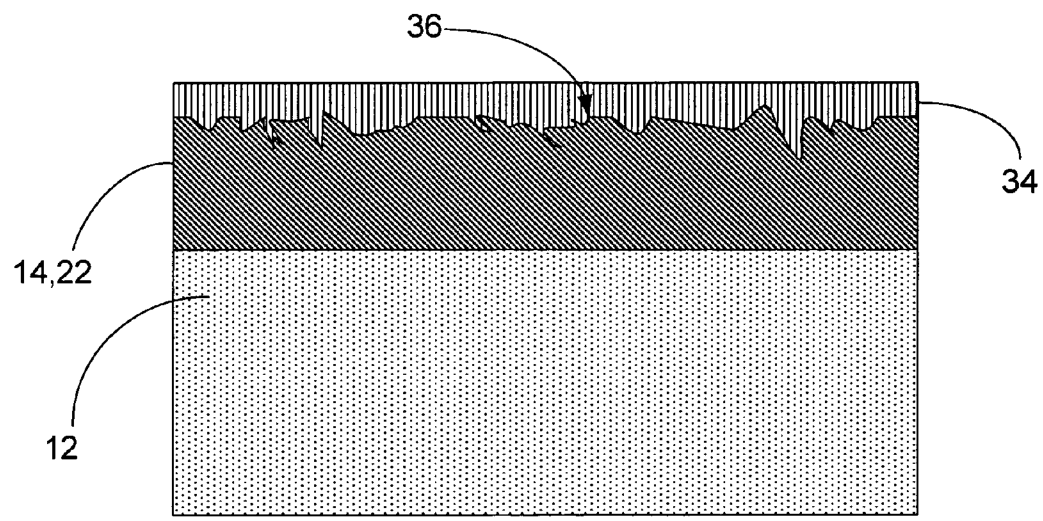
FIGS. 8-11 are a cross-sectional views of a various stages of fabrication of a slider by the method of the present invention.

In contrast to this undesirable condition produced by the prior art, the method of the present invention is seen in FIGS. 8-11. FIG. 8 shows that the baked photoresist material 14 on the unshaped block 12 of slider is treated with an overcoat 34 of material having an index of refraction closely matching the index of refraction of the photoresist material 14. This index matching overcoat 34 fills in the cracks 24 in the damaged photomask 22. The non-scattering boundary 36 between the photoresist 14 and the index matching overcoat 34, although still uneven, is between two materials of similar index of refraction. Thus, when light passes through the boundary 36, it is not refracted or reflected significantly, and is thus not scattered.

Figure 9:
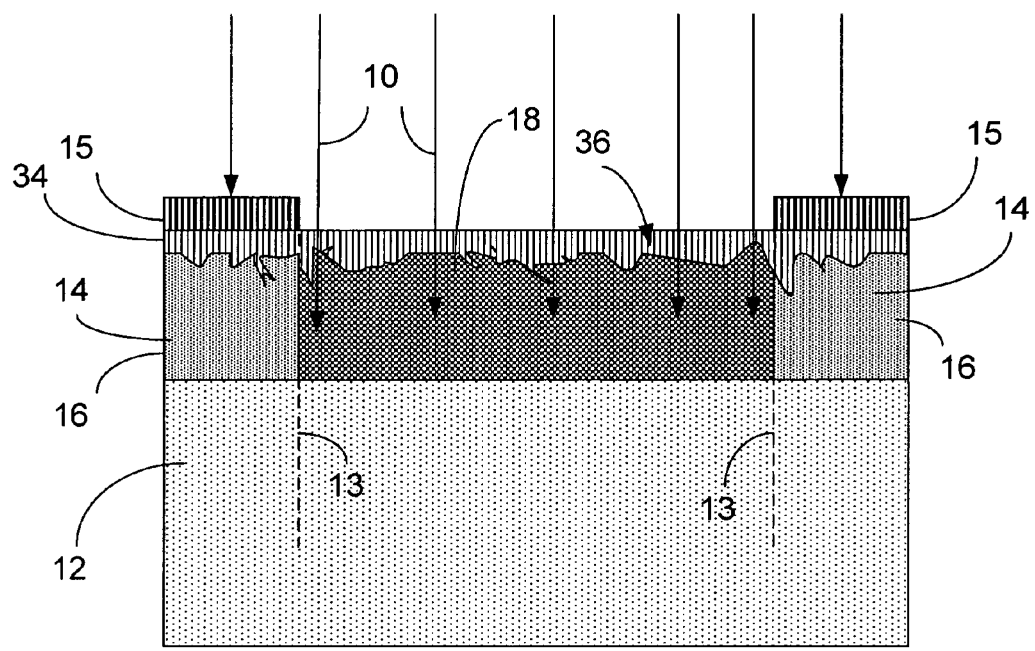

FIG. 9 shows the photoresist material 14, now covered with the index matching overcoat 34, which has the pattern mask 15 positioned on the overcoat 34. As before, the pattern mask 15 serves to shield portions of the photoresist material 14 from light exposure. Again the figure has been greatly simplified with only two areas of the pattern mask 15 shown, corresponding to the two side rails or pads, which will be formed. It will again be understood that in practice, the pattern mask 15 is more spatially removed from the surface of the photoresist layer 14, generally with a lens (not shown) between pattern mask 15 and the photoresist layer 14 to focus the pattern onto the surface of the photoresist 14. For the sake of simplifying the illustration, the lens has been omitted from the figure and the pattern mask 15 draw in closer proximity to the photoresist layer 14 than is realistic.

Light beams 10 strike the photoresist 14, and wherever the light beams 10 strike, the photoresist 14 is exposed and becomes soluble to developer and thus can be removed in the following step. Ideally, the pattern mask 15 will form protected areas 16 in photoresist material 14, leaving exposed portions 18, which will be removed. Once again, a dashed boundary line 13 shows the intended boundary of the protected area 16. The light beams 10 striking irregularities in the boundary 36 between the overcoat 34 and the photoresist 14 are now not scattered but pass through undeflected to create exposed areas 18 which are all outside of the dashed boundary line 13, as intended. There are no unintended exposed areas 19 formed (see FIG. 4 (prior art)) as in the process of the prior art.

Figure 10:
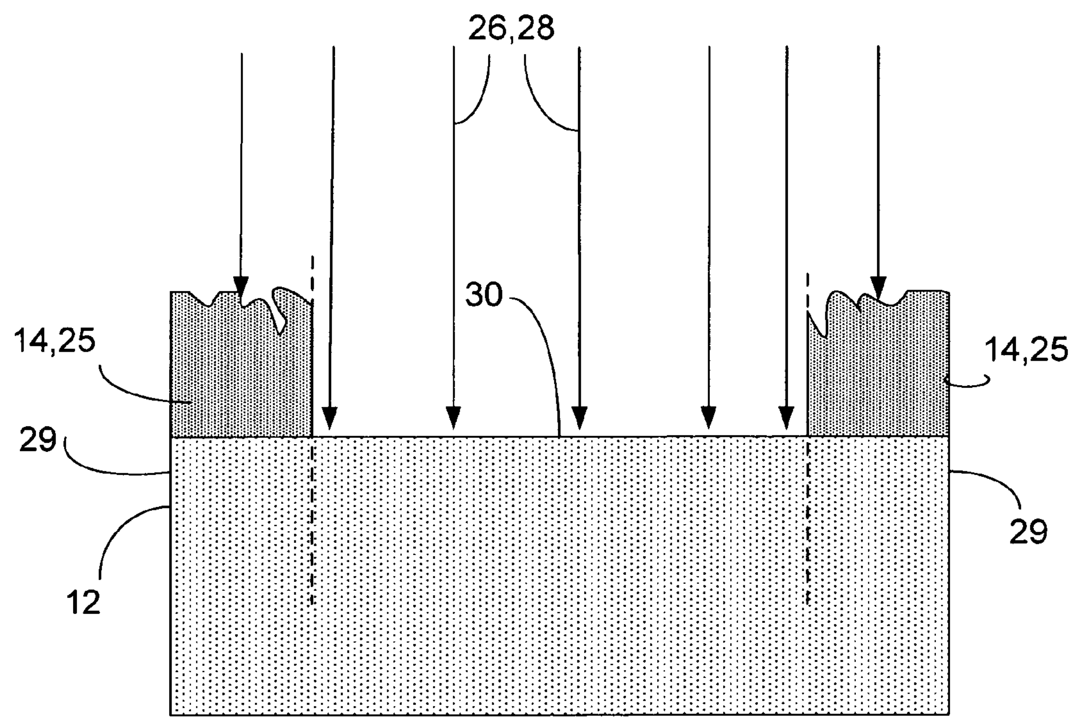

FIG. 10 shows the developed photomask 25, in which the exposed areas of the previous stage have been removed. The overcoat 34 (see FIG. 9) is preferably of material that is dissolved by the developer and has now also been removed. The developed photomask 25 and unshaped slider block 12 are subjected to a milling source 26, preferably ion milling beams 28. The developed photomask 25 creates protected areas 29 of the slider block 12 and exposed areas 30 of the slider block 12. The ion milling beams 28 remove exposed material in the exposed areas 30 only, thus creating the configuration desired, without the reflective notching defects produced by the prior art.

Figure 11:
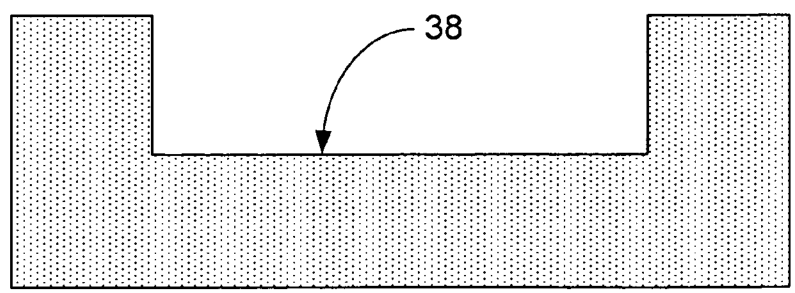

In FIG. 11, the photomasks 25 (see FIG. 10) have been removed. The smooth slider 38 produced by the method of the present invention is shown.

While any number of organic polymers exist with reasonably close optical properties as the overcoat base component, a particularly simple method for practicing this invention is to use a water soluble polymer such as poly(vinyl alcohol) or PVA. It has been found that good results were achieved by using an approximately 10% solution of approximately 88% hydrolyzed PVA of molecular weight of approximately 10000 in deionized water and filtering the solution down to approximately 1 micrometer. Films prepared from this solution were spin-coated at approximately 3000 rpm, and produced a thickness of approximately 0.5 micrometers. This polymer solution was applied to a single slider carrier, precoated with an approximately 15 micrometer liquid resist film. (such as AZ9260 available from AZ Electronic Materials) Due to solubility differences, the coating of aqueous PVA solution has no adverse effect on the resist coating. The standard photo process is then carried out. During the development, the PVA film is dissolved by developer and thus it is not necessary to remove it with a separate removal step. For carriers processed using the PVA modified process, the mouse bite problem has been eliminated. It is to be understood by those skilled in the art that the values used in this example process are approximate, and are not to be construed as a limitation. A range of polymers of varying weights and concentrations in solution are possible. It is also possible to use polymers which are non-water-soluble; however this would involve the use of solvents to remove the overcoat, and is thus less preferred.

In matching the index of refraction of the overcoat material to that of the photoresist, it is to be understood that an exact match is not possible, nor is it to be construed as a requirement. It is estimated that an overcoat having an index of refraction that is plus or minus 0.1 from that of the photoresist will produce acceptable results, although a range of plus or minus 0.05 would be preferred.

Although the above discussion has focused on the fabrication of sliders for disk drives, it is to be understood that the same method can be used in fabrication of any components in which photoresist material may develop cracks or irregularities which may result in reflective notching defects. Thus it has a wide range of applications and is not to be construed to be limited only to slider fabrication.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A method of fabrication for minimizing refractive notching defects in fabricated components, comprising:

A) providing an unshaped block of component material;

B) applying a photoresist material layer on said unshaped block;

C) baking said photoresist material layer;

D) applying an index matching overcoat to said baked photoresist material layer;

E) applying a pattern mask to said baked photoresist material layer with said index matching overcoat to form protected areas and exposed areas of said baked photoresist material layer;

F) exposing said baked photoresist material layer with said an index matching overcoat to light;

G) developing said baked photoresist material layer and removing said index matching overcoat and the exposed backed photoresist material layer to produce developed photoresist mask areas which form protected areas of said unshaped block of component material; and H) milling said unshaped block of component material except the protected areas with a milling source to form a shaped component.

2. The method of claim 1, wherein said milling source comprises ion milling beams.

3. The method of claim 1, wherein said index matching overcoat comprises an overcoat base material.

4. The method of claim 3, wherein said overcoat base material comprises a polymer having an index of refraction which is in the range of plus or minus 0.1 from an index of refraction of said photoresist material.

5. The method of claim 4, wherein said polymer comprises a water soluble organic polymer.

6. The method of claim 4, wherein said polymer comprises polyvinyl alcohol.

7. The method of claim 3, wherein said overcoat base material comprises a polymer having an index of refraction which is in the range of plus or minus 0.05 from an index of refraction of said photoresist material.

8. The method of claim 1, wherein said index matching overcoat comprises a solution of 10% polyvinyl alcohol in water.

9. The method of claim 8, wherein said solution comprises 88% hydrolyzed PVA of molecular weight of approximately 10,000 in deionized water and the solution is filtered to approximately 1 micrometer.

10. The method of claim 1, wherein D) comprises spin-coating said overcoat at approximately 3000 rpm.

11. The method of claim 10, wherein said spin coating is applied to a thickness of approximately 0.5 micrometers.

12. A method of fabrication for producing sliders for disk drives free from refractive notching defects comprising:

A) providing an unshaped block of slider material;

B) applying a photoresist material layer upon said unshaped block;

C) baking said photoresist material layer;

D) applying an index matching overcoat to said baked photoresist material layer;

E) applying a pattern mask to said baked photoresist material layer with said index matching overcoat to form protected areas and exposed areas of said baked photoresist material layer;

F) exposing said baked photoresist material layer with said an index matching overcoat to light;

G) developing said baked photoresist material layer and removing said index matching overcoat and the exposed baked photresist material layer to produce developed photoresist mask areas which form protected areas of said unshaped block of slider material; and H) milling said unshaped block of slider material except the protected areas to form a shaped component.

* * * * *